United States Patent
Gomez et al.

(10) Patent No.: US 9,825,976 B1
(45) Date of Patent: Nov. 21, 2017

(54) DETECTION AND CLASSIFICATION OF EXPLOIT KITS

(71) Applicant: FIREEYE, INC., Milpitas, CA (US)

(72) Inventors: Joshua Lewis Gomez, Union City, CA (US); Abhishek Singh, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 240 days.

(21) Appl. No.: 14/871,830

(22) Filed: Sep. 30, 2015

(51) Int. Cl.
  *H04L 29/06* (2006.01)
  *G06N 99/00* (2010.01)
  *G06N 7/00* (2006.01)

(52) U.S. Cl.
  CPC ......... *H04L 63/1416* (2013.01); *G06N 7/005* (2013.01); *G06N 99/005* (2013.01); *H04L 63/1425* (2013.01)

(58) Field of Classification Search
  CPC . H04L 63/14; H04L 63/1425; H04L 63/1441; G06F 8/427
  USPC ..................................... 726/22, 26; 717/156
  See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf- . cited by examiner.

(Continued)

*Primary Examiner* — Brian F Shaw
(74) *Attorney, Agent, or Firm* — Rutan & Tucker, LLP

(57) ABSTRACT

A non-transitory computer readable storage medium having stored thereon instructions executable by a processor to perform operations including: responsive to determining that a correlation between a representation of the first portion of network traffic and a representation of a known exploit kit results in a score above a first prescribed score value, classifying the representation of the first portion of the received network traffic into an exploit kit family corresponding to the representation the known exploit kit; and responsive to determining that the score is below the first prescribed score value and above a second prescribed score value, (i) analyzing the representation of the first portion of the received network traffic, and (ii) processing, within a virtual machine, a second portion of the received network traffic to determine whether processing of the received network traffic results in behavior indicative of an exploit kit is shown.

20 Claims, 4 Drawing Sheets

(56) References Cited

U.S. PATENT DOCUMENTS

| | | |
|---|---|---|
| 6,108,799 A | 8/2000 | Boulay et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,499,283 B2 | 7/2013 | Mony |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |

(56) References Cited

U.S. PATENT DOCUMENTS

| | | |
|---|---|---|
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,650,170 B2 | 2/2014 | Tonn |
| 8,650,637 B2 | 2/2014 | Beresnevichiene et al. |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,413,781 B2 | 8/2016 | Cunningham et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |

(56) References Cited

U.S. PATENT DOCUMENTS

| | | |
|---|---|---|
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1* | 2/2010 | Thomas ............... G06F 11/3604 726/22 |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |

(56) References Cited

U.S. PATENT DOCUMENTS

| | | |
|---|---|---|
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1* | 10/2012 | Green .................... G06F 21/566 726/24 |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1* | 5/2014 | Wang .................... G06F 21/566 726/23 |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0363598 A1* | 12/2015 | Xu .................... G06F 21/563 726/23 |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 02/23805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

AltaVista Advanced Search Results. "attack vector identifier". Http://www.altavista.com/web/results?Itag=ody&pg=aq &aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq &aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

(56) References Cited

OTHER PUBLICATIONS

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 3.3" RFC 1950, (1996).

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase © CMU, Carnegie Mellon University, 2007.

Hjelmvik, Erik , "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King") (2003).

Krasnyansky, Max , et al., Universal TUN/TAP driver, available at https://www.kernel.org/doc/Documentation/networking/tuntap.txt (2002) ("Krasnyansky").

Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael , et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].

Marchette, David J., "Computer Intrusion Detection and Network Monitoring: A Statistical Viewpoint", ("Marchette"), (2001).

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., "'Analyzing and exploiting network behaviors of malware.'", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J. , et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

(56) References Cited

OTHER PUBLICATIONS

Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

DETECTION AND CLASSIFICATION OF EXPLOIT KITS

FIELD

Embodiments of the disclosure relate to the field of cyber security. More specifically, embodiments of the disclosure relate to a system for detecting anomalous, or more specifically, unwanted or malicious behavior associated with network traffic.

GENERAL BACKGROUND

Over the last decade, malicious software has become a pervasive problem for Internet users as many networked resources include vulnerabilities that are subject to attack. For example, payloads downloaded while browsing the Internet may exploit these vulnerabilities by allowing a third-party to gain access to one or more areas within the network not typically accessible. For example, a third-party may exploit a software vulnerability to gain unauthorized access to email accounts and/or data files.

For instance, content (e.g., payloads within network traffic) received by a network device while loading an Internet web page may include an exploit kit, which may be understood as a self-contained framework designed to exploit known vulnerabilities and/or download and install additional malicious, anomalous or unwanted objects. Exploit kits, as well as the additional objects that may be downloaded, may attempt to acquire sensitive information, adversely influence, or attack normal operations of the network device or the entire enterprise network by taking advantage of a vulnerability in computer software.

For example, the user of a network device, e.g., a laptop, may activate (e.g., click on) a link while browsing the Internet. The link may open up a new window, or tab within the web browsing application, and redirect the user to an unwanted web page instead of loading the web page expected by the user. The redirect may perform additional actions that may include downloading and installing malicious, anomalous and unwanted payloads.

In current malware detection systems, exploit kit detection is based on a correlation of signatures of known exploit kits. However, in order to generate a signature for an exploit kit, the exploit kit necessarily must have been activated such that malicious, anomalous or unwanted behavior affected one or more network devices or the operation of the network itself. Therefore, current malware detection systems are unable to proactively detect exploit kits and prevent the download and activation thereof.

In some situations, a redirect, a hidden link on a web page or content that automatically downloads upon activation of a link, may enable a third-party to access one or more storage areas of the network device (e.g., contact list or password storage). As another example, through a redirect, a hidden link or automatically downloaded content, a third-party may gain access to the network to which the network device is connected (e.g., an enterprise network) through the network device without proper permissions. Stated generally, exploit kits and additional payloads downloaded in association with an exploit kit may affect the network device, an enterprise network to which the network device is connected, and/or other network devices connected to the enterprise network in a negative or anomalous manner.

Based on the shortcomings set forth above, current signature-based malware detection systems do not proactively detect exploit kits effectively in order to prevent the download thereof and/or the download of additional malicious, anomalous or unwanted payloads.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
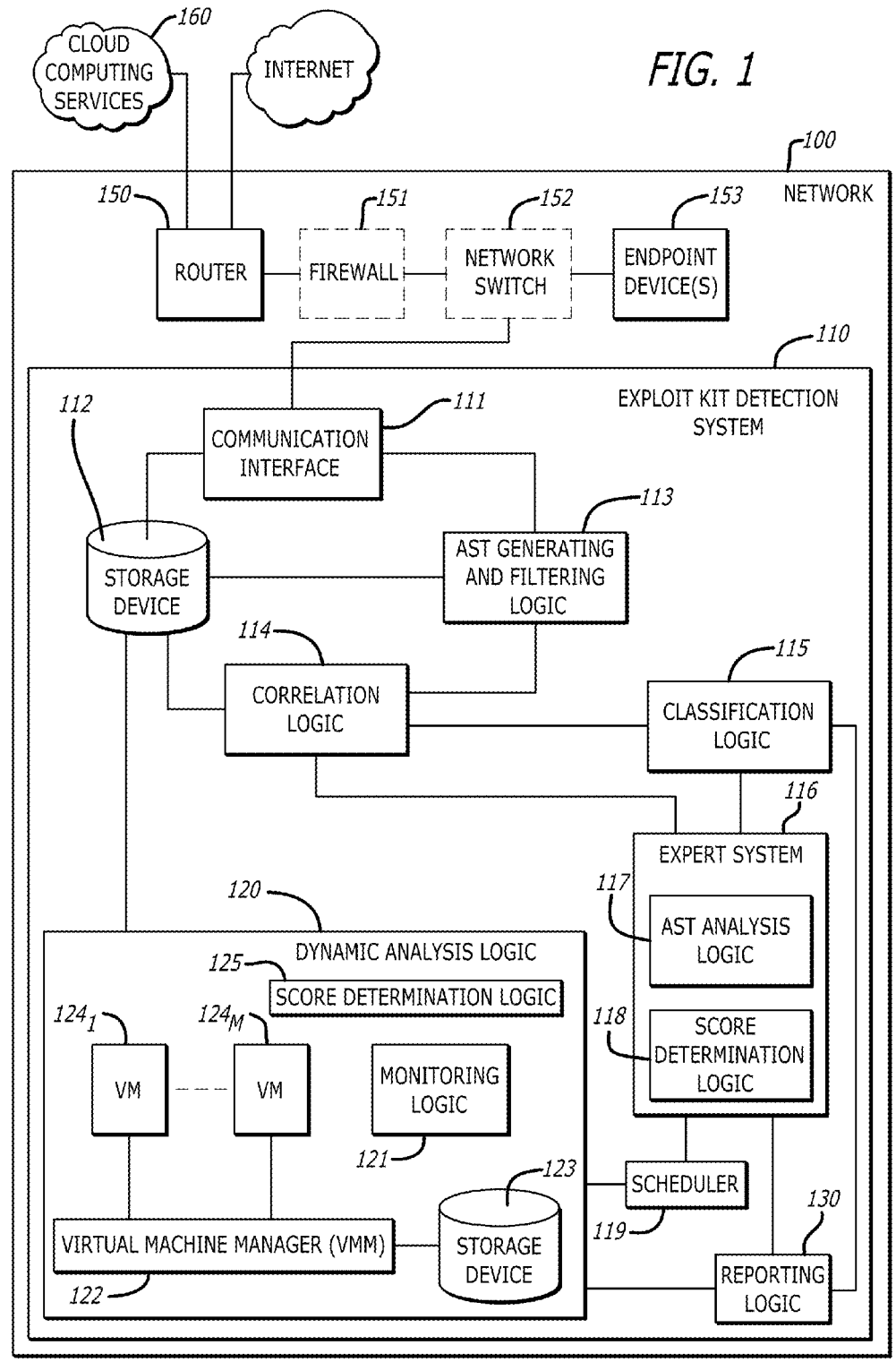
FIG. 1 is an exemplary block diagram of an exploit kit detection system 110.

Various embodiments of the disclosure relate to a detection system that improves detection of exploit kits, particularly, exploit kits for which a signature has not previously been generated. Herein, an exploit kit may lead to infection of an endpoint device with malware, wherein "malware" may collectively refer to exploits that initiate malicious, anomalous or unwanted behaviors.

In one embodiment of the disclosure, the exploit kit detection system comprises one or more of an Abstract Syntax Tree (AST) generating and filtering logic, a correlation logic, a classification logic, an expert system and a dynamic analysis logic. The exploit kit detection system may capture network traffic addressed to one or more endpoint devices within a network (e.g., an enterprise network), parse HyperText Markup Language (HTML) source code within the network traffic, extract the JavaScript™ included within the HTML source code, generate an AST from the extracted JavaScript™ and filter the AST (e.g., the AST provides a standard form for the HTTP source code that is susceptible to analysis). The exploit kit detection system then correlates the filtered AST with ASTs of known exploit kits to determine whether a level of similarity (e.g., a score value based on a performed correlation, wherein the level of similarity may be represented as a percentage, which may be equal to or less than 100%) above a first threshold exists. When a correlation above the first threshold exists, the filtered AST is determined to be within a family of an exploit kit. Herein, it is advantageous to classify an AST that has at least a predetermined level of similarity (e.g., a percentage) with an AST of a known exploit kit as exploit kits may morph quickly. Therefore, as an exploit kit morphs, minor changes to the exploit kit do not prevent the exploit kit detection system from detecting and classifying the morphed exploit kit even though an exact AST has not yet been identified and stored for the exploit kit. Exploit kits that change, or morph, may be referred to as "polymorphic exploit kits." The minor variations associated with a polymorphic exploit kit have previously made detection of versions of a polymorphic exploit kit for which a signature was not created very difficult. However, correlating the filtered AST with ASTs of known exploit kits enables the exploit kit detection system to account for the minor variations.

Additionally, the detected exploit kit may be used in future correlations with received network traffic. Therefore, the exploit kit detection system is able evolve automatically without the involvement of a network administrator.

Other embodiments may extract additional and/or alternative portions of the received network traffic. For example, an embedded object may be extracted from the HTML source code or from another portion of the received network traffic and analyzed with the exploit kit detection system. Another example may include the extraction of Flash components (e.g., graphics, text, animation, applications, etc.) from the HTML source code and analysis of the Flash components with the exploit detection kit system. Other HTML plug-ins may similarly be extracted, wherein a plug-in may be an application or applet design to extend the functionality of a web browser. Additionally, HTML is merely one example of one markup language used to create web pages. Therefore, alternative markup languages, such as eXtensible HyperText Markup Language (XHTML) may be extracted in place of, or in combination with, the HTML. Other programming languages, scripting languages and markup languages may be used (e.g., XML, Perl, Tcl, Python, PHP: Hypertext Preprocessor (PHP), etc.).

When the correlations do not reveal a level of similarity above the first threshold, the exploit kit detection system determines whether there is a level of similarity above a second threshold being lower than the first threshold. This second threshold signifies that the filtered AST includes some resemblance to a known exploit kit but the system does not have enough confidence to determine the network traffic includes an exploit kit without further analysis. Subsequently, the filtered AST is provided to an expert system which applies heuristic, probabilistic and/or machine learning algorithms to the filtered AST during analysis to further determine a likelihood of the filtered AST including an exploit kit and, if applicable, obtaining a context for dynamic processing. The context may include, but is not limited or restricted to, results of an n-gram analysis performed on the name of a file included within the received network traffic. Examples of heuristics that may aid in the determination of a score, as discussed below, include but are not limited or restricted to, the presence, or lack thereof, of: a redirection from a secured website ("HTTPS") to an unsecured website ("HTTP") or vice versa; a number of images above a predefined threshold; and/or POST requests for personal information.

When the expert system determines that a score for the filtered AST is above a third predefined threshold, the HTML source code associated with the filtered AST, the score and the context are provided to the dynamic analysis logic. When the expert system determines the score for the filtered AST is not above a third predefined threshold, the HTML source code associated with the filtered AST is provided to the dynamic analysis logic. The HTML source code is then processed within one or more VMs and monitoring logic monitors the processing for malicious, anomalous or unwanted behaviors. Such behaviors are recorded and upon completion of the processing (e.g., expiration of a predefined time or a certain number of actions have been performed), a score is determined that indicates whether the dynamic processing discovered an exploit kit. A user of an endpoint that was to receive the network traffic and/or a network administer may be alerted to the results of the processing via alert generated by a reporting logic. Such an alert may include various types of messages, which may include text messages and/or email messages, video or audio stream, or other types of information over a wired or wireless communication path. Additionally, when an exploit kit is determined to have been detected, a representation of the filtered AST may be stored for inclusion in future analyses of received network traffic.

As used herein, the transmission of data may take the form of transmission of electrical signals and/or electromagnetic radiation (e.g., radio waves, microwaves, ultraviolet (UV) waves, etc.).

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

The term "exploit kit" should be construed as a self-contained framework designed to exploit known vulnerabilities and/or download and install additional malicious, anomalous or unwanted objects. In particular, an exploit kit may comprise a plurality of scripts (e.g., written in PHP) that target specific vulnerabilities. These vulnerabilities are typically security holes in software applications such as Internet browsers (e.g., Internet Explorer, Google Chrome, Mozilla Firefox, etc.) or other software applications (e.g., Adobe PDF Reader, Adobe Flash Player, etc.). In some embodiments, an exploit kit will be downloaded onto an endpoint device after visiting a website. For example, upon activating a link (e.g., selecting to download data or merely clicking on an advertisement), the user may be redirected to various websites, which may also redirect the user to multiple servers. Upon encountering a compromised server, the exploit kit will be downloaded and run automatically such that malicious, anomalous or unwanted behavior results. For example, a plurality of popups may be generated, the user may be redirected again to various websites, or callbacks may be made to a server in an attempt to download payloads. Alternatively, an exploit kit may be downloaded with received network traffic, even from an uncompromised server, and attempt to create a communication line with a foreign server in order to download a payload. This action typically happens without the knowledge of the user and occurs automatically after the initial user interaction of visiting a particular website or activating a link. Exploit kits pose serious security threats as additional payloads downloaded as a result of the callback may attempt to steal sensitive information (e.g., credential information, financial information, etc.) or merely result in anomalous or unwanted behavior.

The term "processing" may include launching an application wherein launching should be interpreted as placing the application in an open state and simulating operations within the application. Processing may also include performing simulations of actions typical of human interactions with the application. For example, the application, "Google Chrome" may be processed such that the application is opened and actions such as visiting a website, scrolling the website page, and activating a link from the website are performed (e.g., the performance of simulated human interactions).

The term "network device" should be construed as any electronic device with the capability of connecting to a network, downloading and installing applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," and "mobile device" will be used interchangeably. The terms "mobile application" and "application" should be interpreted as software developed to run specifically on a mobile network device.

The term "malicious" may represent a probability (or level of confidence) that the object is associated with a malicious attack or known vulnerability. For instance, the probability may be based, at least in part, on (i) pattern matches; (ii) analyzed deviations in messaging practices or formats (e.g., out of order commands) set forth in applicable communication protocols (e.g., HTTP, TCP, etc.) and/or proprietary document specifications (e.g., Adobe® PDF document specification); (iii) analyzed header or payload parameters to determine compliance, (iv) attempts to communicate with external servers during dynamic processing, (v) attempts to access memory allocated to the application during dynamic processing, and/or other factors that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting exploit kits encountered as a result of browsing the Internet. As this invention is susceptible to embodiments of many different forms, it is intended that the present disclosure includes illustrative embodiments and general principles of the invention and is not intended to limit the invention to the specific embodiments shown and described.

II. General Architecture of an Exploit Kit Detection System

Referring to FIG. 1, an exemplary block diagram of an exploit kit detection system 110 deployed within the network 100 is shown. In one embodiment, the network 100 may be an enterprise network that includes the exploit kit detection system 110, a router 150, an optional firewall 151, a network switch 152, and one or endpoint devices 153. The network 100 may include a public network such as the Internet, a private network (e.g., a local area network "LAN", wireless LAN, etc.), or a combination thereof. The router 150 serves to receive data, e.g., packets, transmitted via a wireless medium (e.g., a Wireless Local Area Network (WLAN) utilizing the Institute of Electrical and Electronics Engineers (IEEE) 802.11 standard) and/or a wired medium from the cloud computing services 160 and the endpoint devices 153. As is known in the art, the router 150 may provide access to the Internet for devices connected to the network 110.

In one embodiment, the network switch 152 may capture network traffic, make a copy of the network traffic, pass the network traffic to the appropriate endpoint device(s) 153 and pass the copy of the network traffic to the exploit kit detection system 110. In a second embodiment, the network switch 152 may capture the network traffic and pass the network traffic to the exploit kit detection system 110 for processing prior to passing the network traffic to the appropriate endpoint device(s) 153. In such an embodiment, the network traffic will only be passed to the appropriate endpoint device(s) 153 if the analysis of the network traffic does not indicate that the network traffic is associated with a malicious attack, anomalous or unwanted behavior, or, in particular, an exploit kit.

The exploit kit detection system 110 includes a communication interface 111, a storage device 112, an AST generating and filtering logic 113, a correlation logic 114, a classification logic 115, an expert system 116, a dynamic analysis logic 120 and a reporting logic 130.

As shown, the exploit detection kit 110 is communicatively coupled with the cloud computing services 160, the Internet and one or more endpoint devices 153 via the communication interface 111, which directs at least a portion of the network traffic to the AST generating and filtering logic 113. The AST generating and filtering logic 113 receives at least a portion of the received network traffic from the communication interface 111 and extracts the Javascript™ within HTML source code within the network traffic. The received network traffic may be in, for example, one or more packet capture files (PCAP files). Subsequently, the AST generating and filtering logic 113 generates an AST from the Javascript™. Finally, the AST generating and filtering logic 113 filters the AST, which may include, but is not limited or restricted to, removing hardcoded parameters or variables from the AST, determining and removing portions of the AST that are not accessible (e.g., dead code, typically construed as software code that does not affect the results of running the software code) and/or determining and removing infinite loops within the AST.

In one embodiment, the AST generating and filtering logic 113 may comprise a compiler. In a second embodiment, the AST generating and filtering logic 113 may comprise one or more software libraries (e.g., open source libraries).

The correlation logic 114 receives the filtered AST from the AST generating and filtering logic 113 and correlates the filtered AST with one or more entries in a database (e.g., the storage device 112 or a database stored within the cloud computing services 160). Each entry in the database represents an AST of a known exploit kit. The result of a correlation of the filtered AST and an entry in the database reveals a score indicating a prescribed score (e.g., a percentage, a numerical value, a weighted numerical value) that represents how similar the filtered AST is to the AST of the known exploit kit represented by the databasebase entry. In one embodiment, each database entry takes the form of a hash value (e.g., a MD5 hash value, a secure hash algorithm (SHA) hash value, etc.). In such an embodiment, the correlation logic 114 computes a hash value representing the filtered AST and performs the correlation of hash values. In other embodiments, other representations may be used in place of hash values. Additionally, the correlations between the filtered AST and the entries in the database may be of the entire filtered AST or may be of one or more portions of the filtered AST.

The correlation logic 114 subsequently analyzes the results of the correlations performed by the correlation logic to determine whether a correlation of the filtered AST and an entry within the database reveals a level of similarity above a first predetermined threshold (e.g., 60%, 70%, 80%, etc.). When there is a level of similarity above the first predetermined threshold, the correlation logic 114 passes information associated with the correlation to the classification logic 115. The passed information may include the filtered AST, the entry within the database having a level of similarity above the first predetermined threshold with the filtered AST, and/or the score of the correlation. The classification logic 115 then acts to classify the filtered AST as part of the exploit kit family of the known exploit kit represented by the database entry.

Herein, the use of the correlation logic 114 to compare the filtered AST with ASTs of known exploit kits enables the exploit kit detection system 110 to proactively detect exploit kits. An exploit kit may change at a rapid pace such that a detected exploit kit may morph within a matter of days or weeks such that a strict use of signature matching will not be sufficient to detected the morphed version. Therefore, determining whether the filtered AST correlates with an AST of a known exploit kit to produce a level of similarity above a first predetermined threshold enables the exploit kit detection system 110 to, as discussed above, account for changes from a first version of the exploit kit to a second version. When the exploit kit morphs, it may maintain the same malicious, anomalous or unwanted effects. Therefore, the classification logic 115 classifies the santizied AST as a member of the exploit kit family of the exploit kit represented by the database entry. Furthermore, the classification logic 115 may create a new entry to be added to the database representing the exploit kit detected in the filtered AST. Therefore, the exploit kit detection system 110 continuously evolves as it detects variations in exploit kits.

When the correlation logic 114 determines that no correlation between the filtered AST and a database entry is above the first predetermined threshold, the correlation logic determines whether a correlation of the filtered AST and an entry within the database reveals a level of similarity above a second predetermined threshold being lower than the first predetermined threshold (e.g., 30%, 40%, 50%, etc.). When a level of similarity above the second predetermined threshold is present, information associated with the correlation, as discussed above, is passed to the expert system 116.

The expert system 116 utilizes at least one of heuristic, probabilistic and/or machine learning algorithms to analyze the filtered AST for characteristics and/or attributes indicative of an exploit kit. Based on the results of the analysis, the score determination logic 118 of the expert system 116 determines a score indicative of the likelihood the filtered AST includes an exploit kit. For example, the AST analysis logic 113 may analyze the filtered AST for shell code patterns, No-Operation (NOOP) sleds, function calls known to be vulnerable, and/or perform an n-gram analysis on names of files received with the network traffic wherein the n-gram analysis results are correlated with known malicious class names (e.g., stored in the storage device 112).

Upon determination by the expert system that the AST is suspicious (e.g., a score for the AST generated by the expert system 116 signifying the likelihood the filtered AST includes an exploit kit is above a third predefined threshold), the HTML source code of the network traffic, the score and the context of the analysis are passed to the dynamic analysis logic 120 via the scheduler 119. The scheduler 119 may configure one or more of VM $124_1$-VM $124_M$ (M≥1) with selected software profiles. For instance, the context of the analysis may be used to determine which software images (e.g., application(s)) and/or operating systems to be fetched from the storage device 123 for configuring operability of the VM $124_1$-VM $124_M$.

Upon receiving information from the expert system 116, the dynamic analysis logic 120 performs processing within one or more VMs (e.g., virtual processing) on the HTML source code represented by the filtered AST. Herein, the dynamic processing may occur within one or more virtual machine instances (VMs), which may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine. During the dynamic processing, the network traffic is analyzed. In one embodiment, the monitoring logic 131 may record, inter alia, (i) the location from where the traffic originated (e.g., a trusted or an untrusted website), (ii) the location to where the traffic is being transmitted, and/or (iii) actions taken by received network traffic (e.g., attempts to access particular storage locations, install malware, open anomalous files, attempts to open additional Internet connections (e.g., TCP/IP connections), etc.

In one embodiment, the HTML source code is virtually processed in one or more of VM $124_1$-VM $124_M$. The monitoring logic 121 monitors the processing such that any malicious, anomalous or unwanted behaviors, and any resulting actions, are recorded. In particular, the monitoring logic 121 may monitor processing of the HTML source code for anomalous traffic to be transmitted outside of the network 100, e.g., callbacks to foreign and/or unknown servers. Callbacks to unknown servers may indicate, for example, an attempt by the HTML source code to download additional payloads which may include malware or software code that results in anomalous or unwanted behavior. Of course, additional malicious, anomalous or unwanted behaviors may be recorded by the monitoring logic 121. In one embodiment, the storage device 123 or the storage device 112 may include predefined definitions and/or rules that indicate malicious, anomalous or unwanted behaviors the monitoring logic 121 is to record. These predefined definitions and/or rules may be continuously updated via software updates received via the cloud computing services 160 and/or via a network administrator (for example, using the Internet to transmit such).

Upon completion of the dynamic processing by the one or more VMs, the score determination logic 125 of the dynamic processing logic 120 determines a score for the HTML source code that indicates a level of suspiciousness for the HTML source code, which is attributed to the filtered AST. The determination of the risk level of the network traffic may be based on, inter alia, (i) the location from where the traffic originated (e.g., a known website compared to an unknown website), (ii) the location to where the traffic is being transmitted, and/or (iii) actions taken by received network traffic during processing (e.g., executable code contained in the network traffic attempts to execute a callback).

When the score indicates that the filtered AST is above a predetermined threshold level (e.g., a particular numerical score or within a predefined category such as "malicious"), the filtered AST, and optionally the dynamic results of the dynamic processing and the analysis of the expert system 116, may be provided to a network administrator. In such a situation, when the network traffic represented by the filtered AST has not yet been provided to the endpoint device(s) 153, the network traffic will not be provided to the endpoint device(s) 153. In the situation in which the network traffic has been provided, an alert may be generated by the reporting logic 190 and transmitted to the endpoint device(s) 153 alerting the user of the inclusion of software the processing of which will result in malicious, anomalous or unwanted behaviors, and in particular, if the network traffic includes an exploit kit.

Furthermore, when the score of the filtered AST indicates the network traffic includes an exploit kit, the filtered AST along with, optionally, the results of the dynamic processing and/or the analysis performed by the expert system 116 may be passed to the classification logic 115 for the generation of a database entry detailing the exploit kit. Herein, the classification logic 115 may define a new exploit kit family or add the filtered AST to the exploit kit bearing the greatest similarity to the filtered AST.

When the score determined by the score determination logic 125 does not rise above a predetermined threshold (i.e., the HTML source code does not include an exploit kit or include software the processing of which results in malicious, anomalous or unwanted behaviors), the network traffic is passed to the endpoint device(s) 153, if it had not previously been done.

The reporting logic 130 is adapted to receive information from the dynamic analysis logic 120, the expert system 116 and the classification logic 115 and generate alerts that identify to a user of an endpoint device, network administrator or an expert network analyst the likelihood of inclusion of an exploit kit within received network traffic and, if applicable, the exploit kit family to which the detected exploit kit belongs. Other additional information regarding the exploit kit family may optionally be included in the alerts. For example, typical behaviors associated with the exploit kit family may be included.

Figure 2:
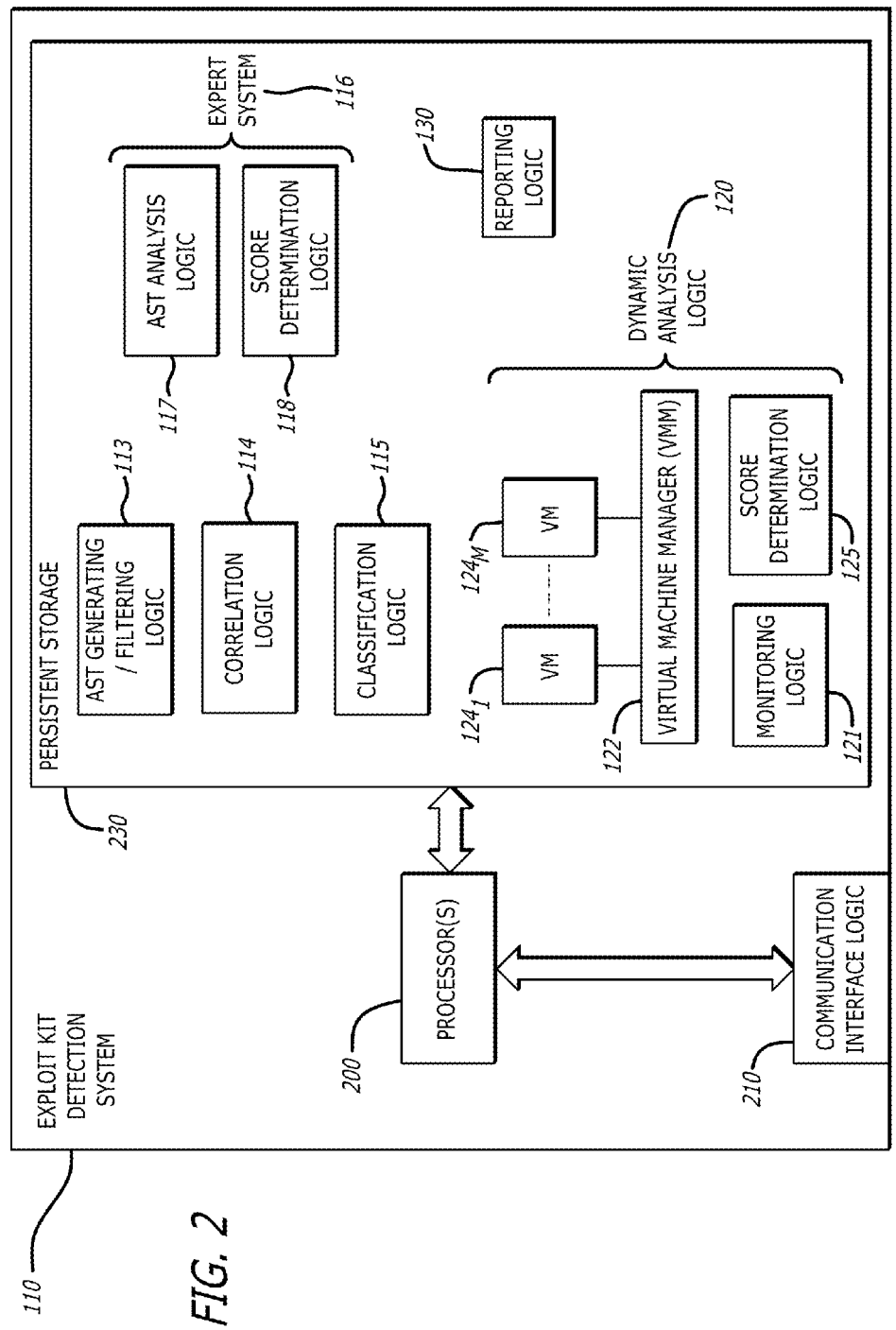
FIG. 2 is an exemplary logic diagram of the exploit kit detection system 110 of FIG. 1.

Referring to FIG. 2, an exemplary embodiment of a logical representation of the exploit kit detection system 110 of FIG. 1 is shown. The exploit kit detection system 110 includes one or more processors 200 that are coupled to communication interface logic 210 via a first transmission medium. Communication interface logic 210 enables communications with network devices via the Internet, the cloud computing services 160 and the one or more endpoint devices 153. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

Processor(s) 200 is further coupled to persistent storage 230 via a second transmission medium. According to one embodiment of the disclosure, persistent storage 230 may include (a) the AST generating and filtering logic 113; (b) the correlation logic 114; (c) the classification logic 115; (d) the expert system 116 including the AST analysis logic 117 and the score determination logic 118; and (e) the dynamic analysis logic 120 including the monitoring logic 121, one or more VMs $124_1$-$124_M$ and the VMM 122. Of course, when implemented as hardware, one or more of these logic units could be implemented separately from each other.

Figure 3A:
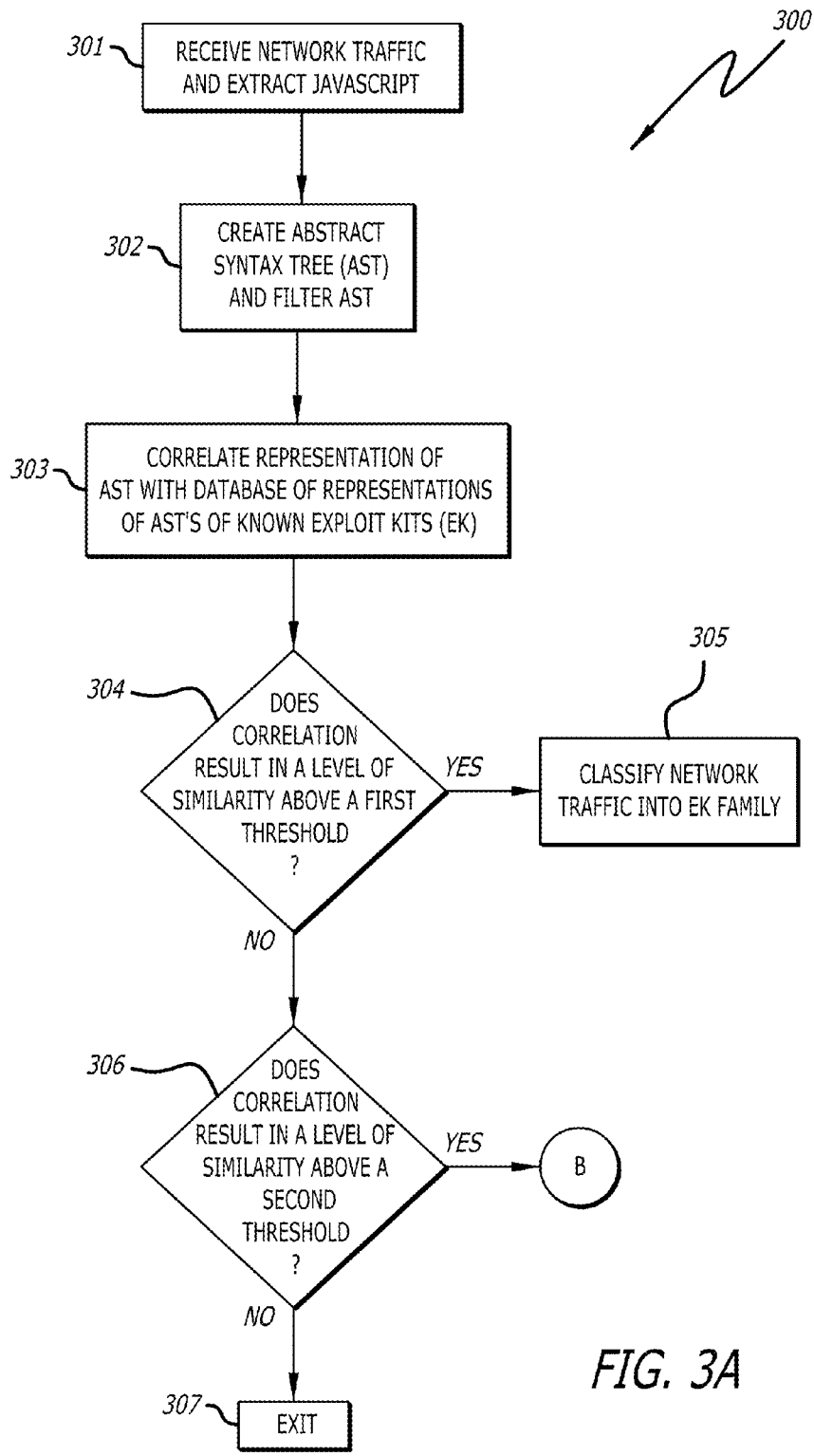
FIG. 3A is the first portion of a flowchart illustrating an exemplary method for detecting and/or classifying an exploit kit with the exploit kit detection system 110 of FIG. 1.
Figure 3B:
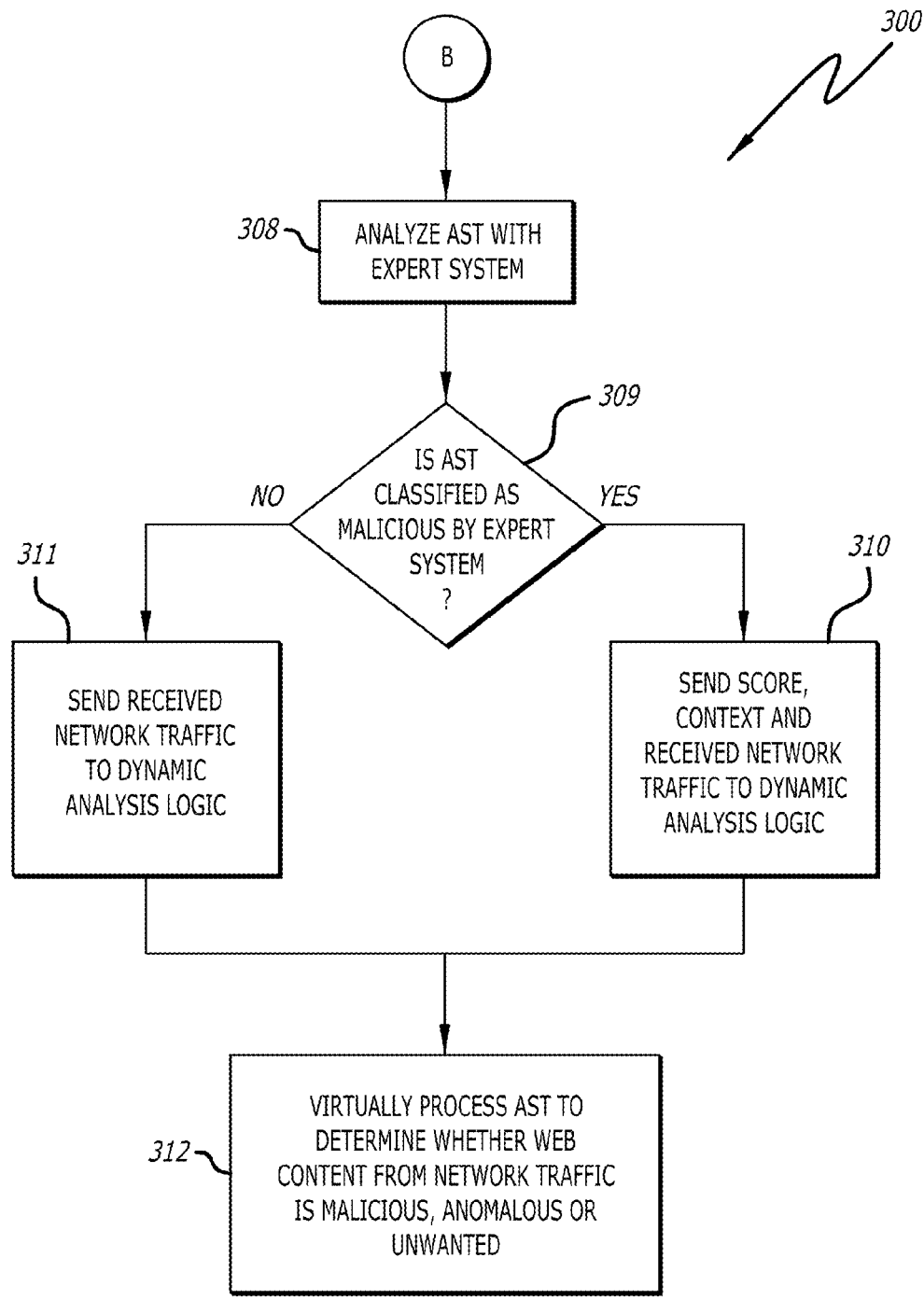
FIG. 3B is the second portion of the flowchart of FIG. 3A illustrating an exemplary method for detecting and/or classifying an exploit kit with the exploit kit detection system 110 of FIG. 1.

Referring to FIGS. 3A and 3B, an exemplary method for detecting and classifying an exploit kit included in received network traffic using the exploit kit detection system 110 of FIG. 1 is shown. Each block illustrated in FIGS. 3A and 3B represents an operation performed in the method 300 of detecting and classifying an exploit kit included in received network traffic. Referring to FIG. 3A, network traffic is received by network 100 and captured by the network switch 152. For example, the network traffic may be captured and sent to the exploit kit detection system 110 for processing prior to passing the network traffic to the endpoint devices 153. Upon receipt of the network traffic, the AST generating and filtering logic 113 parses the network traffic (e.g., HTML source code) and extracts the JavaScript™ (block 301). At block 302, the AST generating and filtering logic 113 generates an AST from the HTML source code. Additionally, the AST generating and filtering logic 113 filters the AST. As was discussed above, in one embodiment, filtering the AST code may refer to removing the hard-coded values within the AST.

At block 303, the correlation logic 114 correlates a representation of the filtered AST with one or more entries within a database, wherein the each entry of the database represents a representation of an AST of a known exploit kit. At block 304, a determination is made as to whether the correlation of block 303 resulted in a level of similarity above a first predetermined threshold between the representation of the filtered AST and an entry in the database. When a level of similarity above the first threshold occurred (yes at block 304), the filtered AST is classified as being part of the exploit kit family to which the exploit kit represented by the entry in database belongs.

When a level of similarity above the first threshold did not occur (no at block 304), a determination is made as to whether the correlation of block 303 resulted in a level of similarity above a second predetermined threshold between the representation of the filtered AST and an entry in the database. When a level of similarity above the second threshold did not occur (no at block 306), the filtered AST is determined to not include an exploit kit and the method 300 ends (block 307). When a level of similarity above the second threshold occurred (yes at block 306), the expert system analyzes the AST (block 308 in FIG. 3B).

Referring now to FIG. 3B, as discussed above, the expert system analyses the AST by through the application of heuristic, probabilistic and machine learning algorithms (block 308). Upon completion of the analysis by the expert system (block 308), a determination is made as to whether the score of the AST exceeds a third predefined threshold (block 309). As discussed above, the third predefined threshold may indicate a level of suspiciousness of the AST. If the score of the AST analysis by the expert system exceeds the third predefined threshold (yes at block 309), the score, the context of the analysis and the HTML source code from the received network traffic are transmitted to the dynamic analysis logic (block 310). If the score of the AST analysis by the expert system does not exceed the predefined score (no at block 309), the HTML source code from the received network traffic are transmitted to the dynamic analysis logic (block 311).

At block 312, the dynamic analysis logic processes the HTML source code in one or more VMs to determine whether the web content received and transmitted during processing of the HTML source code is malicious, anomalous or unwanted. For example, the monitoring logic within the dynamic analysis logic may monitor outgoing network traffic generated by the HTML source code looking for requests to automatically download additional payloads. In some instances, these payloads may be malicious software that is downloaded and installed into the system. Therefore, determining that HTML source code will attempt to download additional payloads on an endpoint device is advantageous and may assist in determining whether the HTML source code includes an exploit kit.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon instructions, the instructions being executable by one or more processors to perform operations including:
   responsive to determining that a correlation between a representation of the first portion of received network traffic and a representation of a known exploit kit results in a level of similarity above a first prescribed score value, classifying the representation of the first portion of the received network traffic into an exploit kit family corresponding to the representation the known exploit kit; and
   responsive to determining that the level of similarity resulting from the correlation between the representation of the first portion of the received network traffic and the representation of the known exploit kit is below the first prescribed score value and above a second prescribed score value,
   (i) analyzing, by an expert system logic executed by the one or more processors, the representation of the first portion of the received network traffic, and
   (ii) processing, within a virtual machine, at least a second portion of the received network traffic to determine whether processing of the received network traffic results in behavior indicative of an exploit kit.

2. The computer readable storage medium of claim 1 having stored thereon further instructions that, when executed by one or more processors, perform operations further comprising:
   correlating, by a correlation logic executed by the one or more processors, the representation of the first portion of the received network traffic with the representation of the known exploit kit.

3. The computer readable storage medium of claim 2 having stored thereon further instructions that, when executed by one or more processors, perform operations further comprising:
   prior to the correlating, removing one or more hardcoded parameters from the representation of the first portion of the received network traffic, wherein the representation of the first portion of the received network traffic is an Abstract Syntax Tree (AST).

4. The computer readable storage medium of claim 1 having stored thereon further instructions that, when executed by one or more processors, perform operations further comprising:
   generating a score representing a level of confidence that processing the representation of the first portion of received network traffic results in malicious, anomalous or unwanted behavior.

5. The computer readable storage medium of claim 4 having stored thereon further instructions that, when executed by one or more processors, perform operations further comprising:
   responsive to determining the score is above a third threshold, configuring the virtual machine in accordance with a context of the score.

6. The computer readable storage medium of claim 1, wherein the analyzing by the expert system logic includes applying at least one of a heuristic algorithm, a probabilistic algorithm or a machine learning algorithm to the representation of the first portion of received network traffic.

7. The computer readable storage medium of claim 1, wherein the analyzing by the expert system logic includes an analysis for a presence of one or more of a shell code pattern, a No-Operation (NOOP) sled or a function call known to be vulnerable.

8. The computer readable storage medium of claim 1, wherein the analyzing by the expert system logic includes an n-gram analysis on a name of a file that is included in the received network traffic.

9. The computer readable storage medium of claim 1, wherein the first portion of the received network traffic includes less than an entirety of a representation of the received network traffic.

10. The computer readable storage medium of claim 1, wherein processing in the virtual machine includes performance of one or more simulated human interactions.

11. An apparatus for exploit kit detection and classification, the apparatus comprising:
   one or more processors;

a storage device communicatively coupled to the one or more processors;

a correlation logic for (i) correlating an abstract syntax tree (AST) representation of network traffic to one or more ASTs representing known exploit kits and (ii) determining whether a level of similarity exists (a) above a first threshold or (b) below the first threshold and above a second threshold;

an AST analysis logic for applying at least one of a heuristic algorithm, a probabilistic algorithm or a machine learning algorithm to the AST representation of the network traffic when the level of similarity is below the first threshold and above the second threshold;

a dynamic analysis logic including one or more virtual machines for processing the AST representation of the network traffic, and a score determination logic for determining a score indicating a likelihood of the network including an exploit kit, wherein the score is based on one or more of the analysis of the AST analysis logic or the processing of the AST representation of the network traffic in the one or more virtual machines.

12. The apparatus of claim 11 further comprising:
an AST generating and filtering logic for extracting JavaScript from the received network traffic, generating the AST representation of the network traffic from the extracted JavaScript and filtering the AST representation of the network traffic.

13. The apparatus of claim 12, wherein the filtering includes removing one or more hardcoded parameters from the AST representation of the network traffic.

14. The apparatus of claim 11 further comprising:
a classification logic for classifying the AST representation of the network traffic into an exploit kit family when the level of similarity is above the first threshold.

15. The apparatus of claim 11, wherein responsive to determining the score is above a third threshold, configuring the virtual machine in accordance with a context of the score.

16. The computer readable storage medium of claim 1, wherein the analyzing by the expert system logic includes applying at least one of a heuristic algorithm, a probabilistic algorithm or a machine learning algorithm to the representation of the first portion of received network traffic.

17. A method for exploit kit detection comprising:
correlating an abstract syntax tree (AST) representation of network traffic to a AST representation of a known exploit kit;

responsive to determining a first level of similarity exists below a first threshold and above a second threshold, applying at least one of a heuristic algorithm, a probabilistic algorithm or a machine learning algorithm to the AST representation of the network traffic; and processing the AST representation of the network traffic in a virtual machine to determine a likelihood that the network traffic includes an exploit kit, wherein the determination of the likelihood is based on results of one or more of (i) the application of at least one of the heuristic algorithm, the probabilistic algorithm or the machine learning algorithm, or (ii) the processing in the virtual machine.

18. The method of claim 17 further comprising:
responsive to determining that a second level of similarity exists above a first threshold, classifying the AST representation of the network traffic into an exploit kit family corresponding to the AST representation the known exploit kit.

19. The method of claim 17 further comprising:
responsive to determining the application at least one of the heuristic algorithm, the probabilistic algorithm or the machine learning algorithm to the AST representation of the network traffic indicate the network traffic is above a predetermined level of suspiciousness, configuring the virtual machine in accordance with a context of the score.

20. The method of claim 19, wherein the context may include results of a n-gram analysis performed on the name of a file included within the network traffic.

* * * * *